United States Patent
Travis

(10) Patent No.: US 6,831,678 B1
(45) Date of Patent: Dec. 14, 2004

(54) AUTOSTEREOSCOPIC DISPLAY

(75) Inventor: Adrian R Travis, Farnborough (GB)

(73) Assignee: Holographic Imaging LLC, Birmingham, MI (US)

( * ) Notice: Subject to any disclaimer, the term of this patent is extended or adjusted under 35 U.S.C. 154(b) by 0 days.

(21) Appl. No.: 09/446,007

(22) PCT Filed: Jun. 26, 1998

(86) PCT No.: PCT/GB98/01866
§ 371 (c)(1),
(2), (4) Date: Dec. 16, 1999

(87) PCT Pub. No.: WO99/00993
PCT Pub. Date: Jan. 7, 1999

(30) Foreign Application Priority Data

Jun. 28, 1997 (GB) .............................................. 9713658

(51) Int. Cl.[7] .............................................. H04D 13/02
(52) U.S. Cl. .......................................... 348/46; 348/57
(58) Field of Search ............................ 348/51, 56, 57, 348/46, 54; 349/15, 27, 87, 5

(56) References Cited

U.S. PATENT DOCUMENTS

| 5,132,839 | A | * | 7/1992 | Travis | 359/462 |
| 5,483,254 | A | * | 1/1996 | Powell | 345/87 |
| 5,959,664 | A | * | 9/1999 | Woodgate | 348/59 |
| 6,002,458 | A | * | 12/1999 | Kancko | 349/61 |
| 6,049,367 | A | * | 4/2000 | Sharp | 348/117 |
| 6,449,090 | B1 | * | 9/2002 | Omar | 359/465 |

* cited by examiner

Primary Examiner—Chris Kelly
Assistant Examiner—Charles E Parsons
(74) Attorney, Agent, or Firm—Nixon & Vanderhye P.C.

(57) ABSTRACT

A video display for displaying a large image to an observer, comprising a screen for displaying patterns, the screen being formed of a plurality of separate areas each capable of receiving a segment of a pattern the segments collectively forming a complete frame of a pattern; projection means for projecting a segment of a pattern to each separate area of the screen in sequence; means for receiving each segment of a pattern and forming a complete frame; and means for illuminating the screen with collimated light to display a large area display.

11 Claims, 8 Drawing Sheets

— TRUE 3D IMAGE
— COARSELY PIXELLATED 3D IMAGE

AUTOSTEREOSCOPIC DISPLAY

This invention relates to the display of three dimensional (3D) video images on a video display. The term video is to be taken as the display of successive frames of still images collectively capable of providing a moving image.

Most moving displays are two dimensional, for example television (video) and movie films. For many applications movement of two dimensional images is adequate because an observer can obtain stereoscopic information from movement.

In non-moving (still) displays two dimensional displays are most common and are quite cheap to produce, by e.g. photocopying, printing, photography. Two dimensional images are provided by displays whose amplitude (amount of darkness and or colour) varies with position within the image. True three dimensional still displays can be provided by holographic techniques with photographic plates for example. Other 3D effects can be provided by a technique known as autostereo.

A three dimensional image can be provided in holographic films by variation of amplitude or phase within the hologram. An observer sees a slightly different image by each eye and at different positions (distance and angular) from the display. A big difference between the two types of display is the amount of information needed, with at least an order of magnitude more data needed for the 3-D case.

Holographic images have been displayed using liquid crystal devices, but suffer from very narrow fields of view, i.e. the stereoscopic effect is only observed over a narrow range of angles.

Moving video displays are formed by displaying frames of still images at a high enough rate that an observer can not detect individual frames, and instead sees a seamless movement. To display 3-D images with movement requires data rates much higher than is easily and cheaply available, especially for large displays.

According to one aspect of the invention, the problem of angle of view is solved by a three dimensional display which includes a spatial light modulator (SLM) on which a repeated sequence of patterns is illuminated by collimated light that scans repeatedly through a series of discrete directions in synchronisation with the holograms.

The term "pattern" is used in this specification to mean a two dimensional variation in phase or amplitude which could comprise the hologram, autostereo distribution or image to be projected.

According to this invention, a three dimensional video display includes: a screen on which successive frames of patterns can be displayed and means for projecting an array of collimated light beams which can each illuminate the whole screen through a series of discrete directions in synchronism with the display of successive frames;

wherein said screen includes a layer of liquid crystal material located between a front plate and a rear plate; a layer of light sensitive material, operable to change the voltage on the adjacent layer of liquid crystal material; a reflective layer between the liquid crystal material and the light sensitive material and electrode structures on the inner faces of plates for applying a voltage across the liquid material, the electrodes forming collectively an array of separately addressable segments in the liquid crystal layer and each collimated light beam is arranged to illuminate the whole of front plate.

The screen may comprise a plurality of separate areas, each independently addressable in field time to form collectively a complete frame of a pattern: for example, the screen could be formed by an optically addressed spatial light modulator having a plurality of separately addressable segments each arranged to receive a sub-pattern in a field time.

In a preferred embodiment, means for projecting patterns on the image is included.

The means for projecting may include means for projecting a plurality of field patterns in sequence on spatial separate areas (A to P) of the image screen or light sensitive layer to form a complete frame of an image and may further include a digital micro mirror device (DMD) having a matrix of separately addressable pixels collectively providing a pattern or part of a pattern for projection on to the screen.

The means for projecting could include a cathode ray tube video display for projecting an image or a part of an image on to the screen.

The invention may include an optical arrangement wherein the means for projecting an array of collimated light beams is arranged substantially in the focal plane of the optical arrangement.

The display of claim 1 where each collimated light beams may be laser light and may be of different wavelengths.

A grating may be included between the projecting means and the screen.

Ideally the images on a video display should be three dimensional like those recorded by holograms so that changes in parallax can be seen as the observer moves closer to or further from the display. and so that the observer can gauge depth by inspecting the image from different viewpoints and by using binocular vision. Holograms are merely high resolution displays and it is possible to display a video hologram on a liquid crystal display, However liquid crystal layers tend to be at least 1.5 microns thick, so the pixels on a liquid crystal tend to be no smaller than 2 or 3 microns, and it follows that the field of view of a hologram on a liquid crystal display is little more than a few degrees. Furthermore the cost of liquid crystal displays scales with resolution in such a way as to make the display of video holograms uneconomic.

Three dimensional images can also be displayed using autostereoscopic pixellation, where the screen comprises a two dimensional array of pixels each of which rather than being Lambertian (as for the display of two dimensional images) controls the intensity of light as a function of ray direction. A simple way of making an autostereoscopic display is to illuminate a liquid crystal display with a continuously scanning spot source of light in the focal plane of a lens. The lens and light source produce rays all travelling in one general direction at any one instant, and if the direction of the rays is synchronised with the display of appropriate views of a solid object on the liquid crystal display, then the eye will integrate a three dimensional image over time. The problem here is that in order to avoid the observer seeing flicker, the liquid crystal display must switch quickly and for good quality three dimensional images this is once again uneconomic.

Unless the positions of all observers are known then three dimensional images almost inevitably require data rates to be an order of magnitude greater than for two dimensional images. Any design of three dimensional display should provide a way of handling these data, but the higher the data rates, the less capacitance can be tolerated on the transmission lines which carry data onto the screen, and therefore the smaller the screen.

Small displays with high frame rates can indeed be made cheaply, for example by lacing a layer of ferroelectric liquid crystal on a silicon substrate, or with a digital micromirror device or cathode ray tube. But users want large three dimensional images, and even with devices where a three dimensional image can be displayed, the effect of magnifying the image to a usable size is to make the field of view too narrow.

Transmission line effects become less relevant if data is transferred in parallel, and this is what happens on light valves (or optically addressed liquid crystal displays) which comprise a sandwich of a light sensitive layer and a light modulating layer such as liquid crystal. When a voltage is applied across the light sensitive layer and the light modulating layer together than an image projected onto the light sensitive layer is transferred across to the light modulating layer, and amorphous silicon/ferroelectric liquid crystal light valves have frame rates of several kilohertz. Furthermore the layers in a light valve are in principle unpatterned, so one can get a device which acts as a high resolution, high frame rate liquid crystal display without the cost of high resolution lithography. If images from a small display are projected onto the back of a light valve, it is possible to assemble a device capable of projecting high resolution two dimensional images from relatively cheap components and various configurations have been proposed. The light valve can be larger than the liquid crystal display so can have higher resolution, but the liquid crystal display can nevertheless address all parts of the light valve if the image of the liquid crystal display is multiplexed across the light valve so that it addresses adjacent areas of the light valve one by one within each light valve frame. The magnification associated with projection makes these configurations inappropriate for the display of three dimensional images, but because they are unpatterned, light valves can in principle be made as large as television screens and still be relatively cheap.

BRIEF DESCRIPTION OF DRAWINGS

The invention will now be described by way of example only with reference to the accompanying drawings of which.

Figure 16:
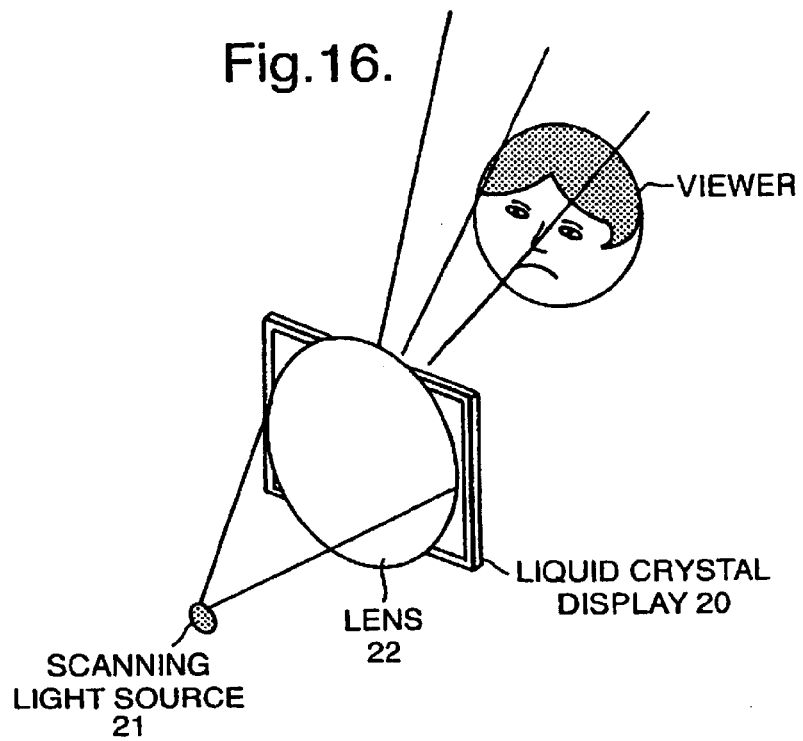
FIG. 16 shows a simple 3D imager.

Description of a simple 3D display as shown in FIG. 16. An image screen 20 is caused to display a data pattern previously recorded. A scanning light source. e.g. an array 21 of laser emitters, illuminates a lens 22 behind the screen 20. The action of light scanning over the display provides a viewer with a 3D image. This shows that 3D may be provided by projection, as well by reflection described below.

Figure 14:
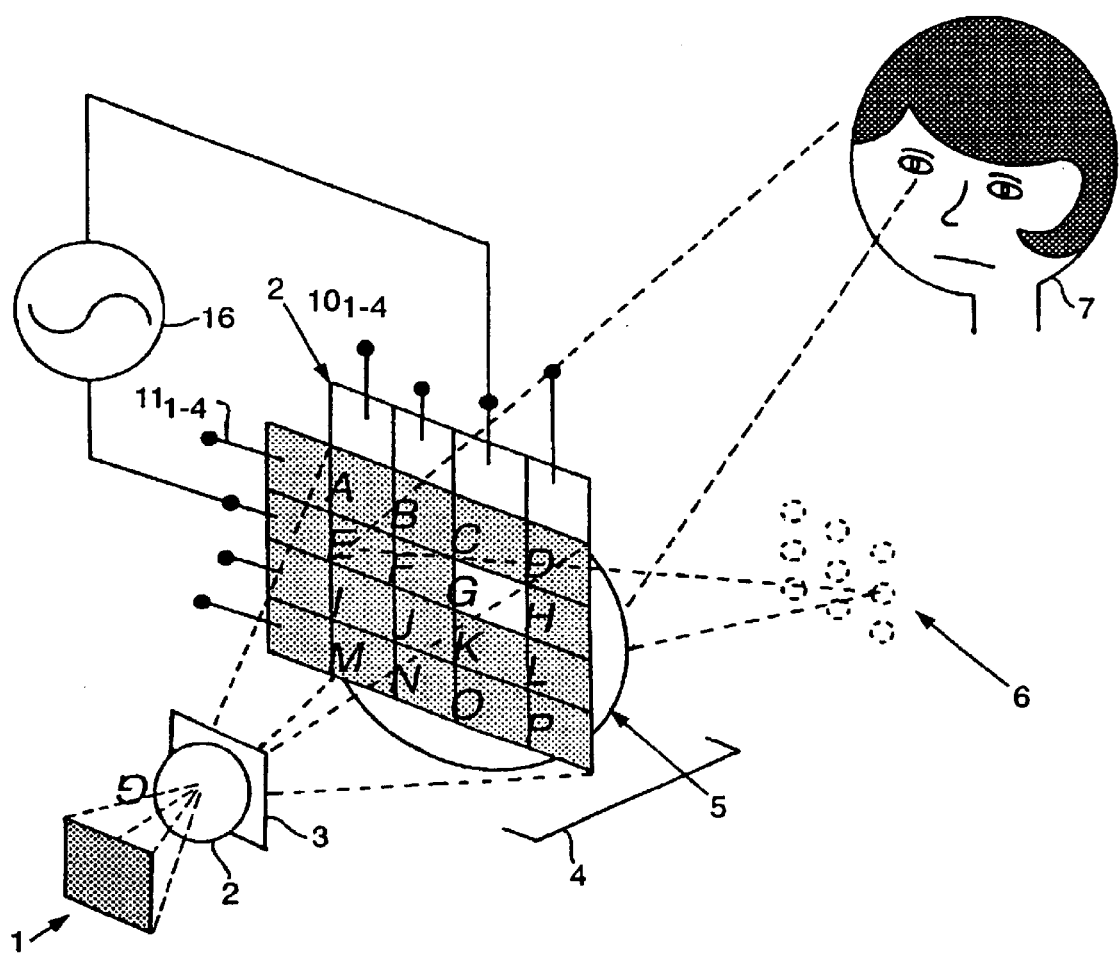
FIG. 14 shows a holographic display of the present invention. It shows how an autostereoscopic/holographic display with a wide field of view can be made by time-sequentially illuminating a high resolution liquid crystal display.
Figure 15:
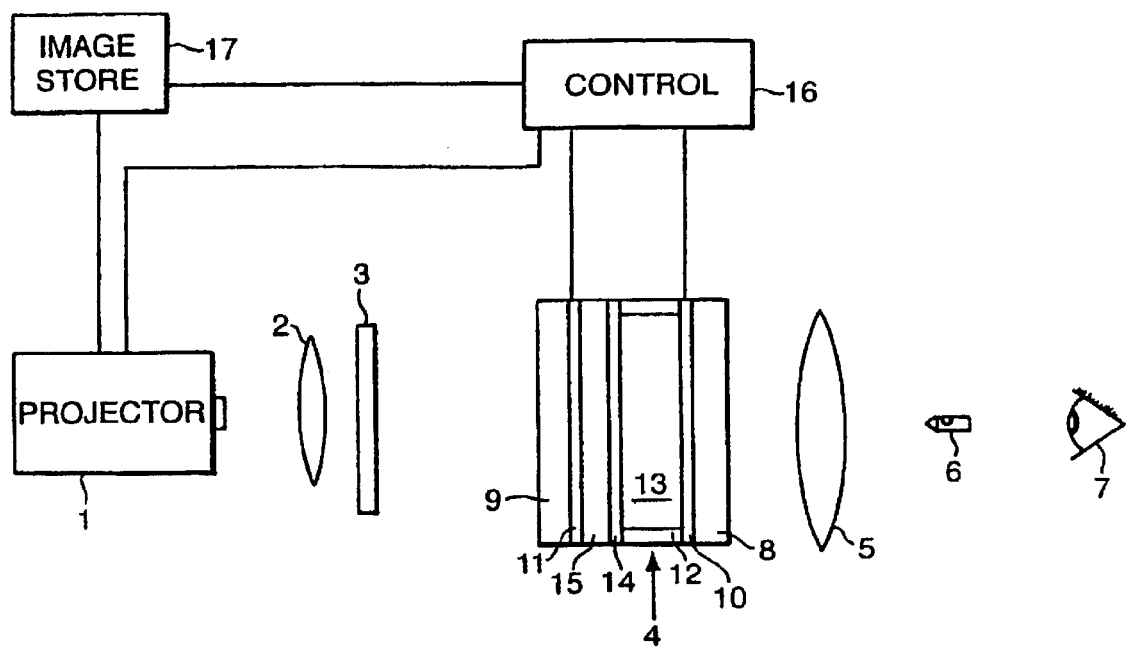
FIG. 15 shows more detail of FIG. 14.

Description of invention with reference to FIGS. 14 and 15.

As shown in FIGS. 14 and 15 a display comprises in serial order, a projector 1, imaging lens 2, grating 3, light valve 4, scanning lens 5, laser array 6, and an observer 7.

For lower performance and cost the projector 1 may be one or more video projector(s) which project images onto the light valve 4. For higher performance, the projector 1 may be a ferro electric liquid crystal display capable of being multiplex addressed by a matrix of transistors to give a high speed image which is projected to the light valve. An example of this is a digital micromirror device (DMD) available from Texas Instrument Inc.

The grating 3 may be formed by two linear gratings arranged orthogonally. Each grating has alternate light and opaque lines with a periodicity dependent upon the number of separate images to be projected onto the light valve 4. As shown the light valve 4 receives a 4×4 matrix of fields, to be described later. For this the wavelength of light divided by grating pitch is approximately equal to the angle between each of the four images on the light valve. The mark space ratio of light to opaque areas of the grating is about 1:3 or 4.

The light valve 4 is a relatively standard item, such as an optically addressed spatial light modulator (OASLM) sometimes called an optically addressed light valve; samples are available from Hughes Inc., Hamamatsu Japan, and Peterlab Ltd St Petersberg Russia.

As shown the light valve is formed of a front plate 8 and a rear plate 9 both formed of glass. The size of the plates determines the size of observed display. For example the display may be 300×300 mm or more. The front plate 8 carries four strip electrodes 10 formed as four column electrodes $10_{1-4}$. The rear plate carries four strip electrodes 11 formed as four row electrodes $11_{1-4}$. Typically the gap between adjacent strip electrodes is about 10 μm, sufficient not to detectable by an observer 7. As shown the electrodes form a 4×4 matrix of segments or pixel (the term pixel is usually reserved for much smaller areas of displays), but could any other suitable number. For example a 1×2, 2×2, or 25×25 or more array as required.

Between the plates 8, 9, separated by spacers 12 which may be distributed across the surface of the plates, e.g. pillars or spacer beads, is a layer 13 typically 1.5 to 3 μm thick of a ferro electric smectic liquid crystal material 13. Next is a light reflecting layer 14 of aluminium formed by numerous dots. Next is a layer 15 of amorphous silicon, sensitive to light imaged thereon. The wavelength of light projected onto the layer 15 can be the same or different from that of the lasers 6.

Voltages are applied to the row and column electrodes by a control unit 16, and serve to change the physical arrangement of molecules within the liquid crystal layer 13. The unit 16 also times the loading of patterns, operation of the projector 1 and switching of the lasers 6.

The laser array of independently emitting lasers 6 is arranged in the focal plane of the scanning lens 5. Each laser 6 is arranged to illuminate the whole of the front plate 8.

An observer 7 will see a holographic image on the front of the light valve 4 when a holographic pattern is illuminated by one of the lasers 6. Illumination by a sequence of the lasers 6 improves the angle of view, and a sequence of holographic images is observed as a moving holographic three dimensional display.

Operation to display a moving 3-D display will now be described: A series of pre-recorded holographic patterns may be provided e.g. from a computer store 17 or laser storage disc in a conventional manner.

A pattern is formed on the ferro electric projector display 1 and imaged through the lens 2 and grating 3 onto the area shown as "A" in the FIG. 14. At the same time a voltage is applied to row 1 and column 1 so that a voltage appears across the pixel shown as A.

The pattern projected is a finely detailed pattern containing phase information as part of a conventional holographic image. The light from this image appearing at "A" falls on the light sensitive layer 15 and alters its conductivity which in turn alters the voltage occurring within the pixel A. This provides minute variation of voltage and minute variation in physical arrangement of the liquid crystal molecules which gives rise to minute variation in phase information across the pixel. This is a first field.

The above process is repeated for each of the pixels shown as "B" to "P" for fields two to sixteen. A total of sixteen field provides one frame or one complete holographic image within the liquid crystal layer 13.

At the end of one frame all the liquid crystal material 13 has been arranged to represent a holographic image when illuminated by one of the lasers 6.

A second frame is imaged onto the light valve 4 as in the first frame. This second frame is slightly different from the first frame and is illuminated by the second laser 6.

This is repeated for a third frame, and illuminated by the third laser 6, or continued for further frames if more than three lasers are used. For example, for a colour display a 3×3 array of red green and blue light would be used, requiring nine separate frames. Use of more than one laser with associated frame improves the angle of stereoscopic view to the observer or observers 7.

After three, or more frames, have been imaged and observed, a new series or three frames is imaged. A succession of different sets of three frames provides a moving three dimensional image to be seen by the observer 7.

Figure 17:
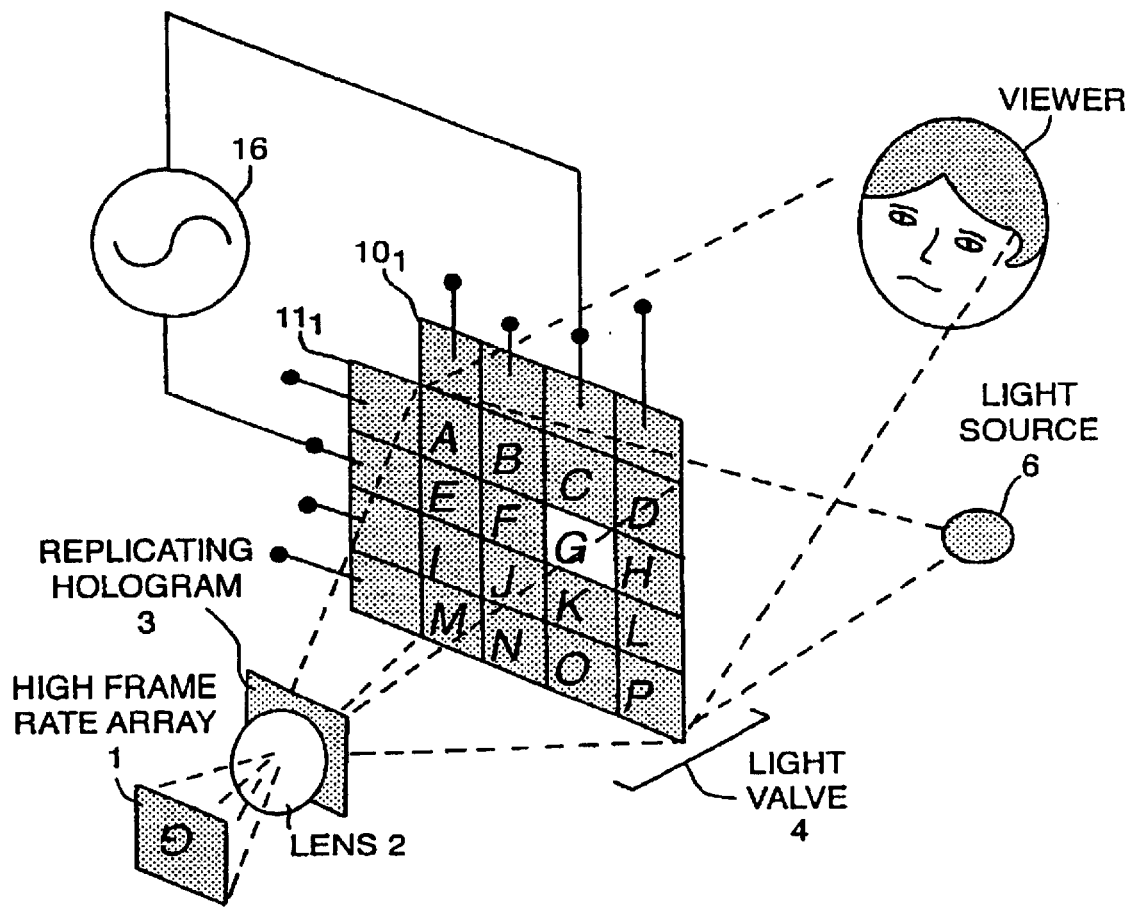
FIG. 17 shows a modification of FIG. 14 arranged to show a large area two dimensional display.

The display of FIGS. 14, 15 may be simplified to provide a large area two dimensional display as shown in FIG. 17. This is similar to that of FIGS. 14, 15 except that a single light source 6 illuminates the screen 4 and reflects light onto a large area display. Alternatively, the screen 4 itself may be made sufficiently large to provide the required size of display. This embodiment uses the technique of a small fast switched projector 1 (such as a DMD) forming a plurality of segment patterns or images to give a large size frame of information that can be switched at a slower rate (but still above an observable flicker rate) to observers. This technique has been termed tiling. When a 2D image is imaged onto the screen 4 a 2D image is seen by the observer. If a holographic pattern is imaged onto the screen 4, then a 3D image can be observed although with a reduced angle of view. Scanning successive patterns provides a moving 3D display as in FIGS. 14, 15.

The text of the priority document is repeated below; the application then continues with the claims of this application.

The Display of Three Dimensional Video Images

1. Introduction

Conventionally televised images are two dimensional yet enable sufficient depth perception that surgeons, for example, are able to operate by them. Nevertheless when depth perception is critical, as it is in manipulative activities like surgery, depth perception is quicker and more reliable if the images have a three dimensional content[1]. Television and video games are likely to be more realistic with three dimensional images, and the interpretation of complicated data more simple, There has therefore been a renewed interest in three dimensional television and while there has been detailed work[2] on the systems needed for this, a concentrated analysis is desirable of the component on whose radical evolution the rest of the system will depend: the display.

Figure 1:
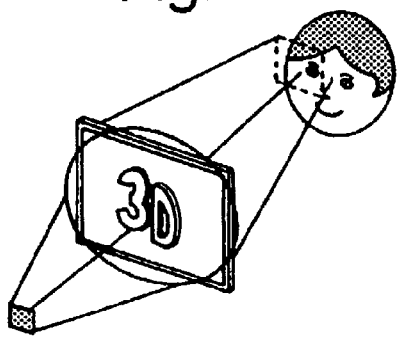
FIG. 1 shows how one can display a 3D image by showing views of the object on a liquid crystal display and illuminating each to an appropriate direction.

It can come as a surprise to learn how little is needed to make a display for crude three dimensional images. For example one need merely take the liquid crystal display from a typical laptop computer, swap the back illuminator for a tens and place a spot source of light some distance behind the lens, as show in:

FIG. 1. The spot source might comprise a laser beam incident on a translucent screen, and under the action of the lens will illuminate the display with rays which converge to form an image of the source. Since the picture on the display will be visible only if observed from within the confines of the image of the source, the picture will have a restricted field of view, and is set up to be a view of a three dimensional object. Other views of the three dimensional object can be made visible to other areas by deflecting the laser beam to a different position for each view. If this operation is repeated at a rate sufficient to avoid flicker and if the whole of the plane of convergence is illuminated then the result will be a steady three dimensional image even, as will be shown later, if the display is viewed away from the plane of convergence.

The three dimensional images formed by such a display will be crude because both the amorphous silicon transistors and the nematic liquid crystal typically found in a liquid crystal display switch too slowly to form many views, Furthermore the display will be small because the complexity of liquid crystal displays makes the manufacture of large devices expensive.

This example conveniently illustrates the problems of three dimensional display. Because of the extra dimension, true three dimensional images require an order of magnitude more data than two dimensional images, and the first challenge faced by the designer is physically to distribute these data across the display's screen at a sufficient rate. Second is that of providing the screen itself with a sufficient space bandwidth product: i.e. enough pixels each switching sufficiently quickly to transfer the data into modulated light. Last is the challenge of enabling the manufacture of a display with these properties without requiring prohibitive precision or cleanliness.

Each of these challenges is familiar to the designer of displays for high definition two dimensional images and it is arguable that, pixellation and optics aside, three dimensional video images are merely a technological extension of their two dimensional predecessors, Nevertheless the variety of schemes recently put forward is bewildering, so this article will proceed by reviewing of some of the more successful technologies and showing that they comprise three distinct schemes of pixellation, One of these, autostereoscopic, shows promise but is flawed at low resolution so the article goes on to calibrate this. The fourth section considers what resolution is needed for a flawless autostereoscopic three dimensional image, and shows that for a typical size of display one can do as well if not better with a hologram. The fifth section proposes a hybrid of autostereoscopic and holographic pixellation which gives the advantages of both and the sixth section shows how photonic devices make the display of such images possible. The paper concludes by evaluating the bandwidth of the latest photonic devices, noting the trend in three dimensional display towards the integration of the display with the computer, and the future dependence of both on advances in gigahertz switches.

II. A Review of Three Dimensional Video Displays

A popular way of screening a three dimensional image is to extend the principle of conventional television to the third dimension by making a device capable of omitting light at any point in a volume (FIG. 2). Perhaps the earliest way of doing this was to reflect light from a cathode ray tube off a circular mirror which vibrated like a drum[3,4]. An image of the cathode ray tube formed at varying distances from the mirror thereby sweeping out a three dimensional volume, but the supporting structure was heavy and the field of view limited. Light emitting diode screens[5,6] or laser-scanned displays[7,8] have been used instead of a cathode ray tube, but the depth scanning mechanism remains cumbersome.

An all but unrestricted field of view can be provided by spinning a two dimensional array of light emitters through a three dimensional volume. Among other ways this has been done with an array of light emitting diodes[9], with a translucent screen which is scanned by lasers[10,11,12], and with a phosphor screen which is scanned (inside a vacuum) by electron beams[13]. The last has the advantage of a cheap screen and scanning mechanism, but any rotating screen system has a singularity at the axis of rotation.

Figure 3:
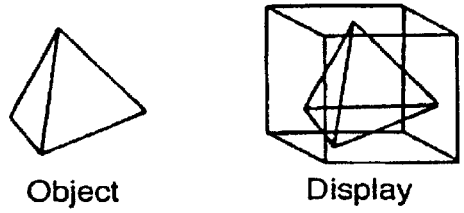
FIG. 3 shows that a 3D array of light emitters cannot display opaque images.

An unrestricted field of view without any singularity can be provided by scanning a pair of laser beams across a transparent material which emits light where the laser beams intersect[14,15]. An image of approximately one cubic centimetre has been demonstrated, but even a larger image would, like both vibrating mirror and spinning disc displays, provide only for the emission of light and not for its absorption. Each of these displays is therefore not able to provide opacity, so while the displayed images are three dimensional they are necessarily translucent (FIG. 3).

Schemes for the display of opaque images have been proposed, for example stacking liquid crystal displays into a volume[16], but even if these were interleaved with light emitters the result would still be incapable of displaying reflections or specularity. The advantage of a volumetric display is that it can provide an unrestricted field of view without excessive data-rates, requiring as it does a data-set of only three dimensions (the alternatives will be shown in effect to require four). This means that volumetric displays are not without potential application, for example in air traffic control or battle management. But the ideal is a device free of all optical restrictions, and one which with certainty can display any three dimensional image is the hologram.

Figure 4A:
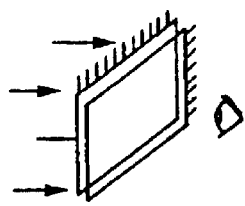
FIG. 4 shows three different holographic 3D displays.
Figure 4B:
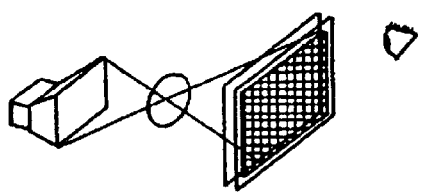
Figure 4C:
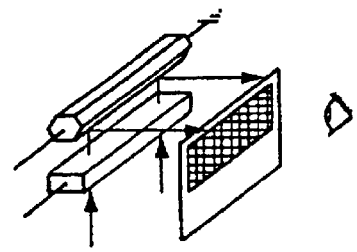

A hologram effectively freezes the optical wave-fronts scattered off a three dimensional object by recording their complex amplitude, and dynamic holograms are often proposed as a way of displaying a three dimensional image[17] (FIG. 4). A greyscale hologram is merely a high resolution two dimensional image, and conventional liquid crystal displays can be used to display such a hologram, albeit with a narrow (4° at present) field of view[18,19]. Wider fields of view require pixellation too fine for active matrix displays, but ferroelectric liquid crystal displays can be made with high resolution at realistic yields[20]. Nevertheless they still require a large number of connectors, and one scheme avoids this by scanning the back of an optically addressed liquid crystal display with a cathode ray tube[21,22]. Even with this improvement the resolution of any liquid crystal display cannot be less than two or three times the cell gap, the result of which is to restrict the field of view of the hologram to a few degrees.

Acousto-optic modulators provide phase modulation and have been used to display colour dynamic holograms[23,24]. The difficulties with scanning mirrors and bulk optics can to some extent be avoided[25], but once again there, is also the difficulty of modulating light at a resolution sufficient to get a wide field of view, which in the case of acousto-optic crystals with their high speed of sound would necessitate gigahertz acoustic waves the generation of which tends to melt the crystals. Even after this physical limitation data rates are necessarily high, whatever the pixellation of the image. They can be further limited for example by summing the hologram from a range of independently modulated spatial frequencies, although one is then not so much displaying a true hologram as displaying a three dimensional image holographically.

It is because of the need to reproduce optical phase that the data rates of a true holographic display are extreme. But the human eye is no more sensitive to the phase of a three dimensional image than it is to the optical spectrum of a colour image, and just as colour images need comprise only red, green and blue primaries, a three dimensional image need comprise only the correct distribution of ray intensity versus position and direction that is specified by autostereoscopic pixellation.

Autostereoscopic displays are named after their stereoscopic predecessors which require the user to wear spectacles. With the latest stereoscopic displays the spectacles comprise a pair of liquid crystal shutters which are synchronised to a screen that displays alternate left and right-eye pictures, and with a sufficiently high frame, rate the viewer sees a flicker-free image. The image provides stereopsis, i.e. the binocular perception of depth, but not kineopsis, which is the monocular perception of depth we accumulate by subconsciously moving our heads around a scene. Of the two, stereopsis is confined mainly to animals such as predators and primates who need to make instant estimates of depth, and it is arguable that even in these species kineopsis is a more relied-upon determinant of depth in static situations. Viewers can experience nausea after prolonged viewing of stereoscopic displays[26] and this may be due to subconscious awareness of the lack of kineopsis, but the real problem with stereoscopic displays is that spectacles get lost.

Spectacles become unnecessary if each view is projected into one eye, and this can be done using the display described in the Introduction, This and displays like it are called autostereoscopic (FIG. 5), a word which like television is an unhappy mix of greek and latin that seems peculiar to the display industry. One cannot expect a viewer to keep his or her head fixed merely for the convenience of the display, so one approach that is attracting great interest is to continually monitor the position of the viewers' heads and adjust the projection optics and view content accordingly.

More than one pair of eyes can in principle be tracked, and if the content of each view is matched to eye position then the display can provide for both stereopsis and kineopsis. Furthermore it might be possible to display views with approximately the right perspective by guessing the distance of each viewer from the screen through measurement of the distance between their eyes, so that almost the only missing depth cue would be accommodation (the ability to focus on off-screen pixels). While the resulting image would therefore be something short of truly three-dimensional, it is unlikely that viewers would notice.

The design of the display for such systems is relatively straight-forward because the data-rate of conventional video need be increased only by a factor of two (or four for two viewers etc)[27,28], so that the major challenge becomes that of identifying and tracking the viewers. Demonstrators have been built which require the viewer to wear an infra-red reflecting spot[29] or a magnetic sensor[30][31,32], but many authors are coy on their plans for tracking bare heads[33].

An elegant approach is to side-illuminate the head with infra-red light so that one eye is illuminated and the other in shadow[34,35], but the shadows of more than one viewer can fall on each other. Another impressive approach is to track the hair/face boundary of viewers[36], while a system which tracks the eye, nose and lips of a face has achieved 80% reliability with the face of the designer[37]. But the latter is slow, tracks only one face, and is less effective with a variety of faces. Advances in technologies like speech, handwriting and object recognition mean that the day must surely come, when systems will be aware of their surroundings, but the development of such machine intelligence will herald a new generation of computing, and progress in these areas has so far been slow. Meanwhile the possibility of irritating glitches due to intermittently unfamiliar situations is never quite excluded, and users are notoriously intolerant of such weaknesses.

Multiple view autostereoscopy makes the position of the viewers' heads irrelevant because the display projects views to every position where a viewer might be. It will be left until the next section to convince the sceptical that such an image can be truly three dimensional, but with the need for a many-fold increase in bandwidth the, design of the display now becomes rather daunting.

The lenslet array is perhaps the longest established such autostereoscopic technology[38,39,40,41], first developed for three dimensional photography and now being applied to displays. Every lenslet covers a pixel from each view, and the lenslets combine to make the pixels comprising each view visible to an exclusive direction. Although lenslets magnify the dead-zone between adjacent sub-pixels this can be smoothed out[42], but the numerical aperture of simple lenslets restricts the field of view of lenslet displays to approximately 15°, outside this angle the three dimensional image repeats itself which can be irritating.

If an array of diffraction gratings is used instead of an array of lenslets, it is possible to get wider fields of view without dead-zones or repeating views[43,44,45], but both grating and lenslet array displays require an underlying display whose resolution is the product of the view resolution and the number of views: a substantial manufacturing challenge. Nevertheless high resolution displays are in prospect, and the latest lenslet array displays assembled in laboratories have eight colour views at VGA resolution.

High manufacturing yields are unnecessary if one makes a display by lining up several video projectors behind a lens[46,47]. In this system the projectors image one view each onto the lens, and the lens makes each view visible to a different direction. The projectors must be precisely aligned, must have uniform brightness, and the projection lenses must be carefully designed to adjoin one another without perceptible gaps.

Both lenslet arrays and multi-projector systems multiplex the views of a three dimensional image from spatially distinct sub-pixels, but one can also use the persistence of human vision to multiplex video images over time. It is possible to take what amounts to a single lenslet with sub-pixels from a lenslet array display and raster scan it across a screen with spinning mirrors[48], but it is difficult to see how to multiplex across the screen in this way without moving parts. The alternative is to multiplex the views over time, and with the lenticular screen this can be done by replacing the lenticular screen with a low resolution array of slits[49,50]. Due to pin-hole optics the slits act at any instant like lenslets and with a low resolution display underneath produce a low-resolution three dimensional image. By scanning the slits over the underlying display it is possible to time-multiplex the equivalent of a full resolution lenslet array but with no lens aberration and no need for high resolution sub-pixels. Slits however waste light and a less wasteful method of getting the same optical effect is to exchange the slit for line illumination[51,52]. Similar but perhaps less complex is the time-multiplexed concept described in the introduction[53,54]. Both latter approaches have the great virtue of wasting no more light than a conventional liquid crystal display, but both require a liquid crystal display with a high frame rate.

Poly-crystalline silicon transistors and ferroelectric liquid crystals each switch an order of magnitude faster than their amorphous silicon and nematic predecessors, and a small liquid crystal display with a frame rate of 1 kHz has been demonstrated[55]. Cadmium selenide and amorphous diamond transistors also switch quickly, and fast-switching grey scale modulation is possible with the distorted helix and electroclinic effects, with monostable or domain switching ferroelectric liquid crystals, and with anti-ferroelectric liquid crystals. However great resources were needed to develop even the existing liquid crystal displays, and greater confidence in the desirability of video three dimensional images will be needed before advanced liquid crystal displays are developed.

A time multiplexed cousin of the multi-projector system can be constructed by replacing the several projectors with a single large projector whose projection lens covers the whole area filled by the multiple projectors[56], and placing over the lens a mechanical[57,58,59] or liquid crystal[60] shutter which blocks light from all but one area. At any instant the projector does the same as one of the projectors in the spatially multiplexed system, but at successive instants different areas of the shutter are made transparent so that each view of the three dimensional image can be projected in turn. Careful alignment is unnecessary so a cathode ray tube can be used without the expense of beam indexing, indeed the concept is so fault-tolerant that the author was able to assemble a crude, system from a cheap video display unit and a couple of fresnel lenses.

In the contest between spatial and time-multiplexing it is the lenslet array which seems to be receiving the most attention from manufacturers, perhaps because the raising of high-resolution yields is primarily a manufacturing challenge of a kind which they have faced so successfully in the past. Certainly the history of the semiconductor industry has been that resolution increases inexorably, but so has switching speed. The great success of the cathode ray tube lies in its ability to effect time-multiplexing, and the time-multiplexed projection system produced an image comprising eight VGA views several years ago. Despite being bulky and optically inefficient this system is robust and flexible and continues to use the high data rate of cathode ray tubes to produce image qualities in advance of lenticular arrays. It is perhaps all the more remarkable that a crude concept with many similarities was built over fifty years ago by Baird[61, 62].

The latest autostereoscopic displays produce images in which each view is visible across an arc of 1°, and there is a consensus among those who have seen such images that they will suffice for initial applications. But if a display is to produce real three dimensional images then it should be able to project the image of pixels at various depths, and the viewer should see perspective which changes with their distance from the image. While it is clear that volumetric and holographic displays can do this, the description of autostereoscopic pixellation so far provided makes it less apparent that autostereoscopic displays can also project real three dimensional images. The next section aims to remedy this.

III: Coarse Autostereoscopic Pixellation

The first proposals for television conjectured systems of spinning slits, and it is instructive to consider what happens if a spinning slit is placed in front of the hologram of a three dimensional image. It is a common experiment to look at a three dimensional object through a spinning slit and it is seen that the scene is unchanged except for being dimmer and perhaps slightly blurred. A hologram should reproduce the wave-fronts of a monochromatic three dimensional image exactly, so a hologram seen through a spinning slit should also appear unchanged. What makes such an experiment significant is that the slit prevents superposition between light from areas of the hologram alternately exposed by the slit. So we can consider the hologram as an assemblage of independent slit-sized sub-holograms. The results of this experiment would be no different if a raster scanning hole were used instead of a spinning slit, so a hologram can be further considered as a two dimensional array of hole-sized subholograms.

The sub-holograms are different from the pixels of a two-dimensional image in that the intensity of light is a function of direction from which the sub-hologram is observed, as well as a function of the sub-hologram's position. Since there are two coordinates of direction (azimuth and elevation) as well as two co-ordinates of position, a four co-ordinate system is required for the true reproduction of a three dimensional image.

Figure 6:
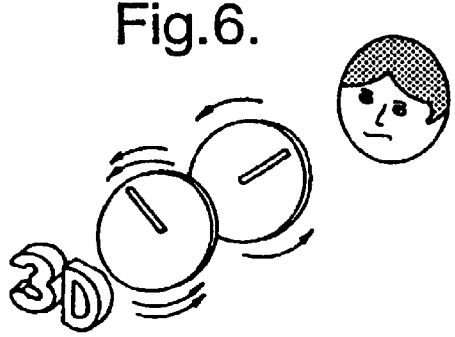
FIG. 6 shows 3D object as seen through a pair of slits, one spinning rapidly, the other slowly.
Figure 2A:
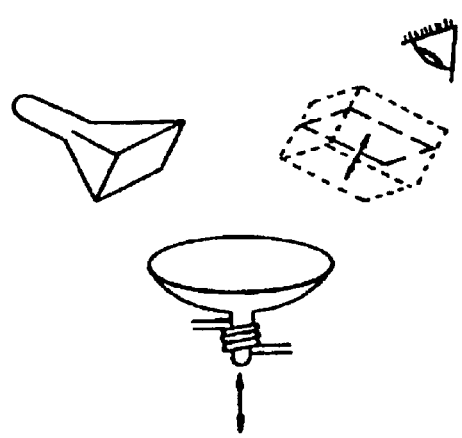
FIG. 2 shows different volumetric 3D displays.
Figure 2B:
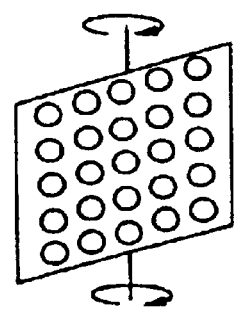
Figure 2C:
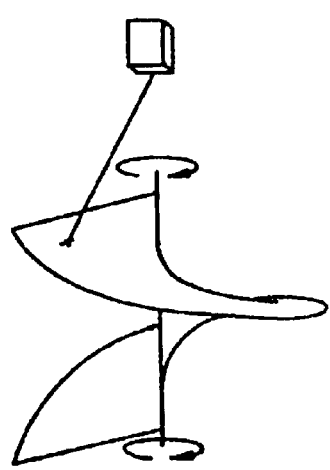
Figure 2D:
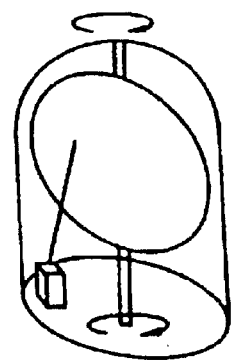
Figure 2E:
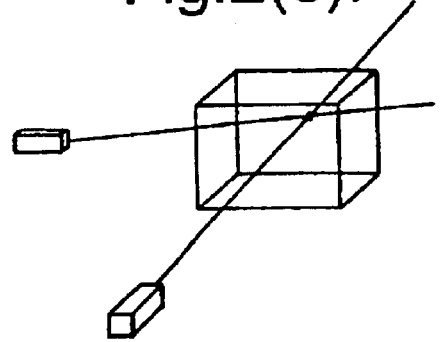
Figure 2F:
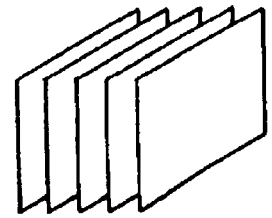
Figure 5A:
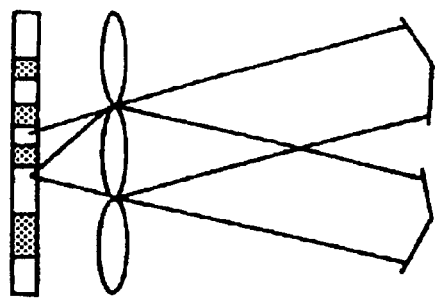
FIG. 5 shows different autostereoscopic 3D displays.
Figure 5B:
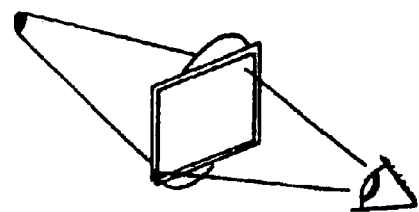
Figure 5C:
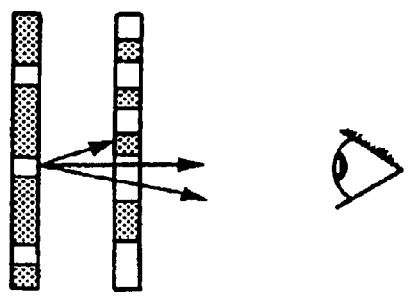
Figure 5D:
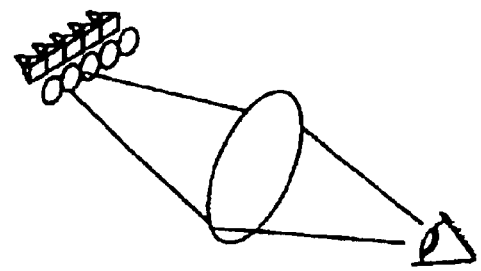
Figure 5E:
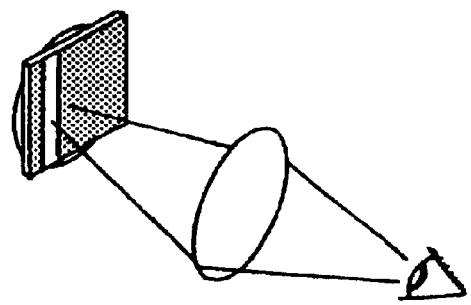

Now imagine that a second spinning slit is placed some distance away from the first as shown in FIG. 6, and that it spins sufficiently quickly that there is no Moiréfringing between the two. We would expect the three dimensional scene to remain unchanged except for being yet dimmer and perhaps more blurred. Only light travelling from the first slit through the second will be exposed at a single instant, and if both slits are replaced by raster scanning holes of sufficiently small diameter then the light passing through both will necessarily constitute a single gaussian ray. Because the second hole exposes rays travelling to different directions alternately it destroys superposition between them. It follows that even if it uses entirely incoherent light, a system which modulates rays as a function of both position and direction will suffice to display a true three dimensional image.

This thought experiment demonstrates that autostereoscopic displays have the potential to produce real three dimensional images, but the images will only be genuinely three dimensional if they are comprised of enough views, and the eight or so views available from existing autostereoscopic displays are too few. If the image is not then genuinely three dimensional, how different does it look?

Figure 7:
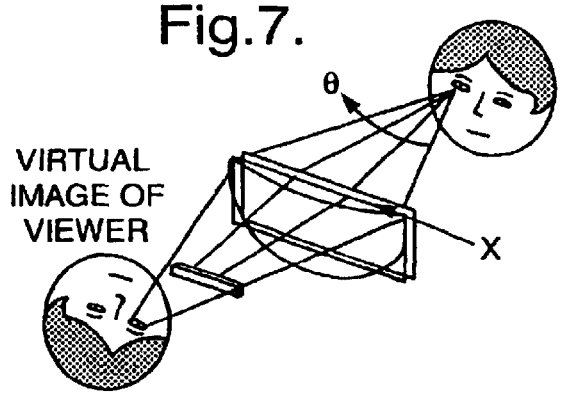
FIG. 7 shows that close to the screen a perspective image is seen whose composition can be determined by ray tracing.

Taking the display described in the Introduction as our model of explanation, imagine that the illumination is collimated and that an eye is far from the liquid crystal display. If a single illuminator is switched on which shines light via the lens towards the eye, then the eye will see the whole of the view associated with that illuminator. If instead the eye is close to the screen, FIG. 7 shows that the angle which the eye subtends to one side of the screen will be, different from the angle which it subtends to the other side of the screen, so the eye will see only part of the view.

The picture integrated by the eye over time can be determined by following rays backwards from the eye pupil through the display to their source. Tracing rays backwards, a virtual image of the eye pupil will be formed by the lens somewhere behind the illuminators. If rays are now traced forward from this virtual image through the boundary between each illuminator, the rays will outline zones on the liquid crystal display. Each zone will be illuminated only when the illuminator outlined behind it is switched on, and since the liquid crystal display shows a different view for each illuminator, adjacent zones will show slices of different views. The result is a picture seen by each eye which comprises a mosaic of sections from each view, and if the view spacing is too coarse then there will be flaw lines between the view sections.

Figure 8:
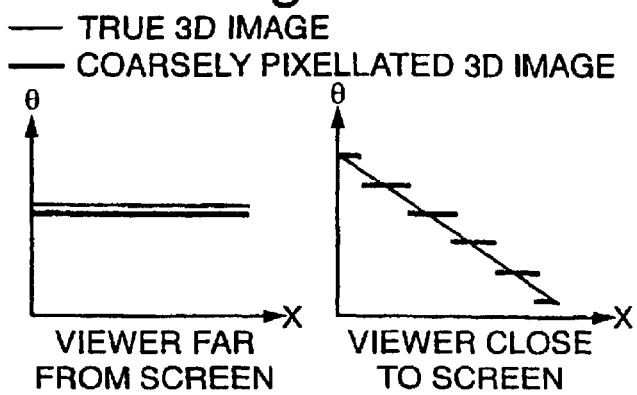
FIG. 8 shows that a plot of pixel direction (θ) versus pixel position (x) can be used to identify what the viewer sees on the display no matter how distant it is.
Figure 9:
FIG. 9 shows a distant photograph of an autostereoscopic display on which each view comprises a horizontal bar.
Figure 10:
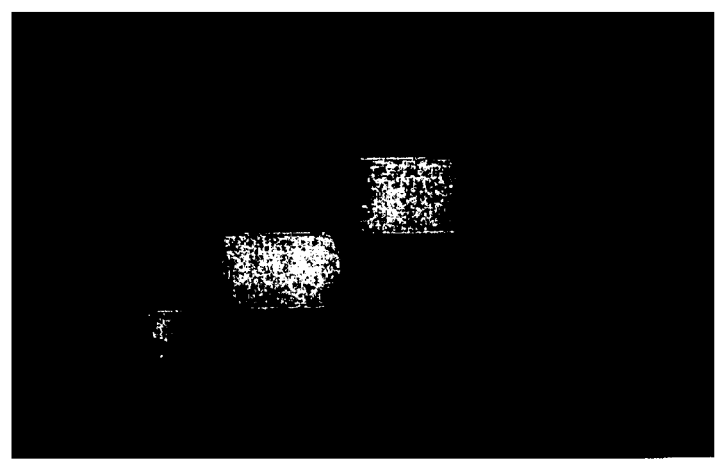
FIG. 10 shows a close-up photograph of an autostereoscopic display on which each view comprises a horizontal bar.

It is the coarseness of view spacing which causes the flaw lines rather than autostereoscopy itself, because the process described above is exactly how one gets perspective with a real object. Far from the object an eye will see a view comprising a parallel projection of the object in that direction, but close up the eye will subtend a different angle to one side of the object than to the other. So the eye will see rays from one side of the, object that are part of a different parallel projection from rays from the other. FIG. 8 shows this schematically, and rather conveniently it proves possible to synthesise the diagram of FIG. 8 on an autostereoscopic display by configuring each view to comprise a horizontal bar: the left-most view with the bar at the top of the screen, the right-most with the bar at the bottom, and the remainder spaced evenly between. The result is an optical test which calibrates the accuracy of the three dimensional display, and photographs of an 8 view-sequential projection display are shown in FIG. 9 and FIG. 10.

It is tempting to suppose that the 3D image on a shuttered cathode ray tube would be smoother if the scanning shutter was scanned continuously as each view was written on the cathode ray tube instead of being moved by a single shutter width between the display of each view[63]. The idea is that this might smooth discontinuities between adjacent views which arise when the angles between them are too coarse. Considering only the horizontal dimension, assume that as the cathode ray tube traces out the x coordinate, the shutter gradually moves by one shutter width. This gives a gradual change, of θ with x so the pixellation in the x/θ diagram is slanted. There will be a distance from the display where someone looking at it will see a picture that can be represented on the diagram by a diagonal which is parallel to the pixellation lines, so that at this distance the viewer will we a single view. This is exactly the result we would get if we put a weak lens in front of the screen of a conventional autostereoscopic display, so the 3D image is not smoothed but merely distorted.

Tolerant as the eye is of flaw lines between views, they nevertheless remain apparent. The claim that an autostereoscopic display produces a true three dimensional image can only be valid if the spacing between views is sufficiently fine, but just how fine is sufficient?

IV: 3D Pixellation

The spacing of 1° per view that was reported in section II to be satisfactory for the present generation of displays requires 60 views for a typical field of view of 60°. It is tempting to state that flaws will only be eliminated on an autostereoscopic display if views are as finely separated as the human eye can resolve[64], but it was one of the breakthroughs in the development of two dimensional video to realise that such rigour is unnecessary. This section assumes that a three dimensional image will be acceptable if with the same pixel dimensions as the equivalent two dimensional image it can be displayed without flaws.

The volumetric array is the format in which computer aided design images are usually stored (indeed perhaps this is how our minds memorise three dimensional images) in which case the angle between each view need be no finer than the minimum difference in projection angle needed to render two views of such an array distinct.

Holograms are physically perfect three dimensional images so have no flaws between views, and in weak moments proponents sometimes claim that all else is mere compromise. But as the previous section demonstrated a hologram is to the eye just an autostereoscopic display where view direction is controlled by diffraction, so holograms will also subtend a measurable angle between views which although too fine to see, will be finite, There will therefore also be a calculable depth of field, even for a hologram.

It is by relating the depth of field and angle per view between each pixellation scheme that the resolutions of differently pixellated images can be matched, and since one so often needs to display images of one format on a display of another, this section aims to formulate these relationships.

Dealing first with a cubic volumetric array, geometric optics is sufficient to determine the angle through which a video camera must move before its image of the array is substantially changed. Starting the camera far from the, array but with sufficient magnification that each pixel at the front of the array maps onto one in the video camera, there will be a certain sideways distance through which the camera must move before the column of pixels at one side of the rear of the array map onto a fresh column of video camera pixels.

Figure 12:
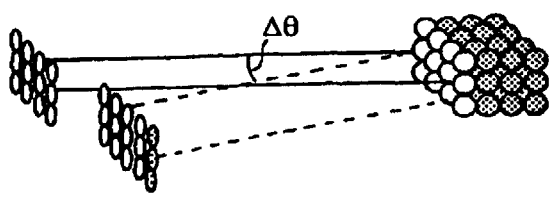
FIG. 12 shows two views of a cubic array formed by parallel projection. The minimum angle (Δθ) between the views required for there to be a distinct difference in view content is that required to make one column of rear pixels fully visible.

FIG. 12 shows that the angle ($\Delta\theta$) subtended by this distance to the centre front of the array equals the width of one array pixel ($\Delta x$) divided by the depth (z) of the array.

$$\Delta\theta = \frac{\Delta x}{z} \tag{1}$$

If the width of each pixel equals its depth and the array is n, pixels deep it follows that:

$$\Delta\theta = \frac{1}{n_z} \tag{2}$$

So the effective angle between views of a volumetric display is the reciprocal of the number of depth pixels, and the, angle subtended by each view on an autostereoscopic display must equal this if it is to show a flawless image of equivalent depth. This means for example that the 3D equivalent of a VGA image comprising 640 by 480 pixels will need approximately 480 views in azimuth if it is to represent an array as deep as it is high over a field of view of 60° (equal to about one radian).

Volumetric displays can usually image only finite depths, but in principle autostereoscopic and holographic displays can act as windows into a three dimensional environment. If the environment is infinitely deep, comprising for example an object with mountains in the background, must the angle between views be infinitesimal?

Figure 13:
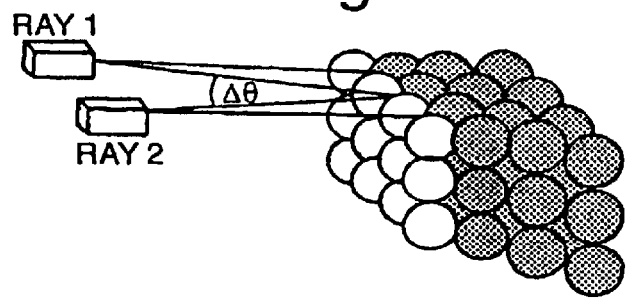
FIG. 13 shows two cameras, in the left hand video camera only the front pixels of the distorted cubic array are visible, while in the right hand camera one column of the rear pixels has become visible. As the depth of the distorted cubic array tends to infinity, RAY 1 and RAY 2 tend towards parallel, so the angle between adjacent views tends to the angle between adjacent pixels.

The mistaken assumption in this question is that views of such an environment will be formed by parallel projection i.e. to assume that views are formed by imaginary cameras far from the scene. In reality the projections the cameras form will be not parallel but perspective, and each camera will be able to resolve fine resolution close to, but coarse resolution far away. The smallest object which can be resolved at any distance from the camera is equal to the width of view visible at that distance divided by the number of pixels per line in the camera. Rather than a uniform cubic array a more appropriate test image is an array of voxels (volumetric pixels) in which the voxel dimension is proportional to the distance of the voxel from the camera: i.e. a distorted cubic array (FIG. 13).

Through what angle can the direction of projection be rotated before the projected image changes? If one rotates about the frontal centre of the cubic array, the limit on rotation without change is set once again by the rear voxels of the array. There will have been an unambiguous change in the projected image once the direction of projection has been changed sufficient to translate the image of the rear voxels by one voxel diameter. Simple geometry shows that as the depth of the cubic array tends to infinity, this angle equals the angle subtended by two voxels at the rear of the array to the camera.

If each pixel in the image plane of the central camera is mapped to a voxel at the rear of the distorted cubic array, then the angle through which the camera can be rotated before the image changes equals the angle between its aperture and two adjacent pixels in its image plane. It follows that in order to televise a pixellated three dimensional image of an infinitely deep scene the angle ($\Delta\theta$) between adjacent cameras should equal the cameras' field of view ($\alpha$) divided by their resolution ($n_x$).

$$\Delta\theta = \frac{\alpha}{n_x} \tag{3}$$

If such an image is to be accurately reproduced on an autostereoscopic display then the angle at which rays from the edges of the display's screen converge should equal the field of view of the cameras. This is so that if the display is substituted for the original scene, the image recorded by the cameras is unchanged. Equation (3) therefore sets the angle between views on the display, so if a display with a field of view of 60° has VGA resolution views and is to act as an infinitely deep 3D window, it needs approximately 640 views in azimuth.

While these translations between volumetric and autostereoscopic pixellation are correct geometrically, the angle per view of an autostereoscopic display is limited, and that of a holographic display determined by the laws of diffraction.

The angle between views ($\Delta\theta$) on an autostereoscopic display cannot be less than the angular divergence ($\delta\theta$) of the rays which constitute each view, which is determined by the wavelength ($\lambda$) and the pixel diameter ($\Delta x$) according to the, law of diffraction[65]:

$$\delta\theta = \frac{\lambda}{\Delta x} \quad (4)$$

so:

$$\Delta\theta \geq \frac{\lambda}{\Delta x} \quad (5)$$

Continuing with the example of a display acting as an infinitely deep 3D window with a field of view of 60° and VGA resolution views, the angle between views according to equation (3) was 1/640 radians. So with red light ($\lambda$=633 nm) equation (5) stipulates that the pixel size cannot be less than 0.4 mm. This is the approximate size of a pixel on a typical VGA monitor, so the restriction placed by diffraction on flawless autostereoscopically pixellated images is remarkably tight.

Figure 11:
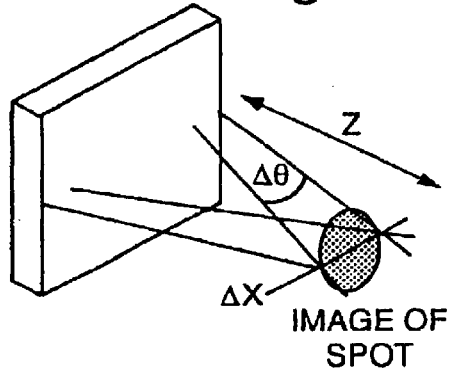
FIG. 11 shows that an off-screen spot can be imaged by setting up rays to converge through it.

The depth of field (z) of an autostereoscopic display is the maximum distance above the screen at which light can be made to converge (as shown in FIG. 11) to form the image of a pixel of diameter $\Delta x$. By trigonometry this distance approximately equals the pixel diameter divided by the angle of ray divergence:

$$z \leq \frac{\Delta x}{\delta\theta} \quad (6)$$

Equation (6) is essentially the same rule of geometry as equation (1) but referred to the co-ordinates of the display rather than those of the camera. Combining this with the law of diffraction given by equation (4) gives:

$$z \leq \frac{(\Delta x)^2}{\lambda} \quad (7)$$

In section III it was noted that although a three dimensional image can be seen through a pair of raster-scanning holes, the image will be slightly blurred, It is diffraction which causes this blurring, and if the diameter of both holes is $\Delta x$ then equation (7) sets the maximum distance z between the scanning holes. Should the distance nevertheless be made greater than this then diffraction through the second hole would filter detail rastered by the first scanning hole such that its effective size would increase to that allowed by equation (7).

Section III also noted that one can represent a single dimension of autostereoscopic pixellation by plotting $\theta$ versus x. But it is well-known that the spatial frequency k of the intersection between a plane and light waves intersecting the plane at angle $\theta$ is given by $$k = \frac{2\pi}{\lambda}\sin\theta \quad (8)$$

If autostereoscopic pixellation is represented instead by a plot of k versus x then the dimensions of pixellation are limited by combining equations (8) and (5) to get the classic expression:

$$\Delta k.\Delta x \geq 2\pi \quad (9)$$

Depicting autostereoscopic pixellation as an array of independent sub-holograms of diameter $\Delta x$, equation (9) reaffirms that the minimum increment in spatial frequencies $\Delta k$ which can be resolved by each sub-hologram is equal to $2\pi$ divided by its width $\Delta x$.

Consider the effect of equation (7) on the three dimensional equivalent of a high resolution monitor, where pixellation can be as small as 90 $\mu$m[66]. The maximum depth of a cubic array would then be only 16 mm, so autostereoscopic systems are fundamentally inadequate for high resolution 3D images for which only holographic pixellation will suffice.

The angle between views on a hologram is also governed by the law of diffraction but because of coherence the maximum width of any ray equals the width (x) of the hologram, so that:

$$\delta\theta = \frac{\lambda}{x} \quad (10)$$

But for a hologram the ray divergence does not equal the minimum angle between views because in the far-field a single ray does not comprise a view. Instead if a lens in the far-field is to form a view $n_x$ pixels wide, then by conservation of information the lens must image a ray bundle $n_x$ pixels wide (or nx/2 if the modulation of the rays is complex). The minimum angle of view of a hologram is therefore $n_x$ times the minimum ray divergence:

$$\Delta\theta \geq \frac{n_x \lambda}{x} \quad (11)$$

The lens will have to be moved through this entire angle before it forms a new and independent view, and if it is merely moved part-way between then it will form a superposition of the adjacent views.

The choice of $n_x$ in this instance is somewhat arbitrary, but once made then the smallest area ($\Delta x$) which can be resolved on the, hologram is by simple geometry:

$$\Delta x = \frac{n_x}{x} \quad (12)$$

Combining this with equation (11) gives:

$$\Delta\theta \geq \frac{\lambda}{\Delta x} \quad (13)$$

This is exactly the same as equation (5), so if a hologram's pixel size is defined to be the same as that of a diffraction limited autostereoscopic image both have the same angle per view, and therefore both have the same information content for the same quality of three dimensional image. Since it has already been shown that a flawless autostereoscopic image with equivalent resolution and size to a conventional VGA monitor is at the diffraction limit, it follows that under typical conditions a flawless autostereoscopic image contains no less information than a hologram.

Diffraction effects will not matter with large displays, nor when cameras are imaging large scenes. But if high resolution images are being formed of small-scale phenomena as would be required for example in 3D keyhole surgery, diffraction effects in the 3D camera will need to be considered and will obey rules similar to those given above.

The depth of field of a hologram is found by combining equations (6) and (10):

$$z \leq \frac{x \cdot \Delta x}{\lambda} \quad (14)$$

So a hologram of width x=20 cm for example, illuminated by light of wavelength λ=500 nm, could in theory project a spot of diameter Δx=100 μm up to 40 m from its surface. Closer to its surface the smallest spot which a hologram can project is equal to its resolution, which in principle can be as small as one wavelength of light. Table I summarises these relationships.

It has been shown that even though a hologram has the same information content as a typical flawless autostereoscopic image, it can resolve much smaller pixels to much greater depths. But the central problem with holograms—that wide fields of view require sub-micron spatial periodicity—remains. Is there no intermediary which shares some of the resolution and depth of holographic pixellation with the relaxed spatial periodicities permissible with autostereoscopic pixellation?

One class of autostereoscopic displays is inherently excepted from the restrictions described in this section—those which use bulk optics. These are a special case because light is coherent across the optical wave-front, so although if all the screen is opaque except for one pixel then light will diffract as with incoherent autostereoscopy, if several adjacent pixels on a bulk optical display are transparent then light will diffract less. Indeed one can imagine writing a zone plate on such a display in order to cause an off-screen pixel to come into focus somewhere above the screen. Displays of this kind make possible an intermediary between autostereoscopic and holographic pixellation by combining them.

V: Hybrid Pixellation

It is proposed to combine autostereoscopic and holographic pixellation into a hybrid scheme which instead of projecting a series of views to different directions, projects a series of holograms to different directions. For example the concept described in the Introduction could be adapted to the new scheme by reconfiguring the liquid crystal display as a hologram, and reconfiguring the illumination to scan through a series of discrete angles (instead of continuously as before).

It is no longer adequate to use geometric optics to render a volumetric data-set into the sequence of patterns to appear on the liquid crystal display, and one is instead obliged to revert to the more rigorous regime of Fourier optics.

The complex amplitude E(k) of light emitted in any direction to a distance far from the object is proportional to the complex sum from all parts of the object of rays in that direction. This far-field distribution should be determined with the necessary angular resolution, approximately equal to the wavelength of light divided by the diameter of the object. It is well-known that the near-field distribution of light is then the spatial Fourier Transform of the far-field distribution[67].

$$E(x) = \int_o^k E(k)e^{\frac{jkx}{}} dx \quad (15)$$

where K is conventionally infinite but in this case need equal no more than the field of view divided by the wavelength. The hybrid scheme requires that this near field distribution be separated into a series of n holograms each to be projected to a different section of the far field. If the far field is divided into n sections, each subtending an angle Xx, then $$E(k) = \sum_{q=1}^{n} [h(k-q\kappa) - h(k-(q+1)\kappa)]E(k) \quad (16)$$

where h represents the unit step function. It follows that $$E(x) = \sum_{q=1}^{n} \int_o^{nx} [h(k-q\kappa) - h(k-(q+1)\kappa)]E(k)e^{\frac{jks}{}} dk \quad (17)$$

$$= \sum_{q=1}^{n} \int_{q\kappa}^{(q+1)\kappa} E(k)e^{\frac{jkx}{}} dk \quad (18)$$

$$= \sum_{q=1}^{n} \int_o^k E(k+q\kappa)e^{\frac{jkx}{}} dk \quad (19)$$

$$= \sum_{q=1}^{n} E_q(\chi)e^{-jq\kappa x} \quad (20)$$

$$= \sum_{q=1}^{n} E_q(\chi) FT[\delta(k-q\kappa)] \quad (21)$$

Where FT denotes the operation of taking a Fourier Transform, and $E_q(x)$ denotes the Fourier Transform of E(k+qκ) frequency shifted by qκ. A lens focuses parallel rays of light so as to produce in its focal plane the distribution of complex amplitude which in the absence of the lens would be the far-field. The lens is therefore said to execute an optical Fourier transform on light travelling from one Fourier plane to the other. A spot source of light constitutes the function δ(x), and if this is placed in the focal plane of a lens then parallel wavefronts will appear in the far focal plane with distribution FT[δ(k-qz)]. A suitable liquid crystal display will modulate these wavefronts with the function $E_q(x)$, and time sequential addressing will sum the series, albeit as a summation of far-field intensifies rather than a sum of complex amplitudes as specified by the algebra. That the result is nevertheless a three dimensional image is because, as ever, the eye is insensitive to phase.

The field of view of a hologram is by the law of diffraction approximately equal to the wavelength of light divided by the pixel diameter, so the field of view (θ) of a hybrid three dimensional image is related to the wavelength (λ), number of views ($n_o$) and the pixel diameter (Δx) by:

$$\theta = n_0 \frac{\lambda}{\Delta x} \quad (22)$$

Assuming a flicker rate of 50 Hz, the frame rate of the liquid crystal display must equal 50 $n_0$ Hz and the spatial periodicity must equal the reciprocal of Δx, so the space-time periodicity must equal fifty times the field of view divided by the wavelength. For a one radian field of view in azimuth with a wavelength of 500 nm, the space-time periodicity should approximately equal 1 Mbit $s^{-1}$: $cm^{-1}$ well above the 5 kbit $s^{-1}$ $cm^{-1}$ capabilities of large high resolution liquid crystal displays[66].

Hybridising the autostereoscopic and holographic pixellation schemes requires that there be coherence between adjacent pixels, and this is a fundamental property of displays with a single light source and bulk optics. In principle therefore the shuttered cathode ray tube system can also display hybrid pixellation images and it has already been noted that the system can screen data at higher rates than that based on liquid crystal displays.

In the description of coherent optics the two lenses in the shuttered cathode ray tube system can both be considered as effecting optical Fourier transforms[60]. Adopting a classical layout, the cathode ray tube, should be in the rear focal plane of the rear lens, and the liquid crystal shutter in the focal plane shared by rear and front.

It is well known that if one takes the Fourier transform of a function twice over the original function results, albeit with a change of sign. The same is true with optical Fourier transforms, so in the front focal plane of the front lens there appears an up-side-down image of the cathode ray tube screen. It is by spatially filtering the optical Fourier transform of this image that the slit in the focal plane shared by both lenses makes each view of the cathode ray tube image visible to a different direction.

This set-up, however, cannot effect the hybrid pixellation scheme, not so much because individual pixels of the cathode ray tube do not cohere (the device could, after all, be swapped for something else) but because if the slit were narrowed to a spatial impulse it would filter out all the low frequency detail from the source. One could instead have impulses in the spatial plane and a liquid crystal hologram in the Fourier plane, but this has few advantages to offer over the single lens approach.

It might seem premature to be considering the ultimate resolution of three dimensional video images when present resolutions are so much lower. But while the resolution of spatially multiplexed and time multiplexed autostereoscopic displays is limited by spatial resolution and frame rate respectively, what the hybrid approach offers is the ability to interchange spatial and temporal periodicity. It is then the product of spatial and temporal periodicity which determines what three dimensional resolution a device makes possible, and devices already exist with the space-time periodicities necessary for high resolution three dimensional images.

VI: Advanced 3D Displays

If liquid crystal displays lack the space-time periodicity needed for hybrid pixellation, one device stands out for its lack of complexity and high space-time periodicity: this is the light valve (also known as an optically addressable spatial light modulator). Section II notes that video holograms have already been screened by optically addressing such a device with a cathode ray tube but the field of view was narrow. With time multiplexed illumination it is possible to get a wider field of view and the frame rate of the latest light valves makes this possible[68]. FIG. 14 shows how the light valve can be addressed by multiplexing the image of an array across its rear, and high frame rate arrays now have the space bandwidth product needed to address light valves over large areas. The great advantage of this approach is that it removes from the screen the two most expensive items: the active matrix transistors and the connector array. One is then left with a screen which may be large but is uncomplicated and a small video projector which may be complicated but is not large. Both devices are therefore potentially cheap, and it is encouraging to note that arguably it is exactly the same division of size and complexity between phosphor screen and electron gun which made it so economic to manufacture cathode ray tubes.

While hybrid pixellation provides for flawless three dimensional images it remains unclear that users object to minor flaws, and autostereoscopic pixellation would certainly be the simplest to implement on such a device if it were fast enough. But the frame rate of the latest light valves seems to be limited to approximately 2 kHz by the RC time constant of the amorphous silicon. Dividing this by 3 for colour and by 60 for flicker one might get 30 views, but if these views have a typical 640 pixels per line and are taken by cameras with a view of half a radian (approximately 30°) then according to equation (2) for a flawless image the angle per view should be 1/1280 radians and the field of view of the device would be less than 1/40 radians (approximately 1.5°). Of course 30 views at the 1° per view which seems acceptable for the first generation of video three dimensional images would result in a satisfactory field of view. But the optically addressed system is not a flat panel, and with autostereoscopic pixellation would produce a three dimensional image little better than the flat panel active matrix liquid crystal display. The extra cost of the latter will eventually depend on how many got made, but in large quantities might be low enough to win over optical addressing.

A typical light valve can resolve down to 10 microns, which with a frame rate of 2 kHz gives a space-time periodicity of $2 \times 10^{15}$ m$^{-2}$ s$^{-1}$. After dividing by 3 for colour and 60 for flicker, one can estimate the solid angle available for viewing by multiplying by $\lambda^2$, equal approximately to $(0.5 \times 10^{-6})^2$ m$^2$. The result is a solid angle of view of 0.025, equivalent to a viewing zone of say 30° in azimuth by 3° in elevation.

Light valves are likely to be able to do better than this. Frame rates of 5 kHz have been reported[69] at the penalty of intense illumination (and a bistable liquid crystal), as have spatial resolutions of 5 microns. But before drawing optimistic conclusions one should consider the problem of writing data to these devices at rates approaching 400 GHz for a 16 cm by 12 cm screen.

An optical fibre is capable of transmitting data at such rates, and a simple method of scanning its output would be a tremendous prize both for displays and telecommunications. But existing acousto-optic devices can barely scan at 1 MHz, and optical amplifier arrays remain rather elementary. It was research into photonics which led to fast-switching light valves, and it is research into photonics which is producing some of the more promising ways of addressing them. If the addressing problem is simplified by requiring an image which is three dimensional only in azimuth, then for a 16 cm wide screen with 240 interlaced lines the data rate reduces to (frame rate×1/lateral resolution×width ×no. of lines)=(2000×10$^5$×0.16×240/2)=4 GHz. This brings the data rate within the range of existing devices and five stand out: acousto-optic holograms, cathode ray tubes, laser diode arrays, ferroelectric arrays and micro-mirror arrays.

Acousto-optic holograms have a successful history but are limited by the speed of sound in acousto-optic materials which at 2 km/s restricts data rates to approximately 4 GHz for an optical wavelength of half a micron. In practice even these rates are difficult because of the melting problems mentioned in section II.

Cathode ray tubes can be electrostatically scanned at megahertz line rates and providing the deflection angle is narrow and beam intensity not too high the spot size can be kept to a diameter of a few microns. But it is difficult to make such a small spot bright without defocusing, and a way must be found of modulating an electron gun at more than 1 GHz, so while these challenges are not insuperable they remain challenges.

Laser diode arrays and the other arrays work by de-multiplexing the input to a sufficient resolution that raster scanning is either not required or need be no faster than can be executed by a liquid crystal hologram. An 18×1 laser diode array has been operated at 8×1 GHz, and 256×256 arrays have been fabricated offering the tantalising prospect of space bandwidth products far in excess of any alternative.

Ferroelectric arrays are fast-switching liquid crystal displays where the active matrix transistors are etched in a silicon integrated circuit. A 320×240 array with a potential frame rate of 20 kHz has been demonstrated[70], offering a space bandwidth product of 3.2 GHz. This is just about enough for a 16 cm wide screen, and it is demultiplexed enough for the array's image to be scanned across the light valve at the 20 kHz rates achievable by a one dimensional ferroelectric liquid crystal hologram. Deflection angles would be small (0.5 mm divided by say 20 cm from hologram to screen equalling 1/40 radian) so the resolution of the one dimensional hologram would be a wavelength divided by 1/40 radian, approximately equal to 20 microns. Micro-mirror array[71] have the advantage of being comprised entirely of silicon although they require a more intricate lithography. Nevertheless arrays of 2048×1152 pixels potentially offer a space bandwidth product of 5.8 GHz. Details of circuitry aside this offers the potential for a screen over 8 inches wide, and if three, such devices were operated in parallel (which is how they are configured for high definition 2D projection) then one could hope for better quality still. But once again optimistic conclusions are inappropriate, in this case because these devices merely convert data from an electronic form to an optical one: there is still required a source of data.

Whatever the capabilities of optical fibre, it seems highly probably that three, dimensional images will be compressed. The convention at present is that displays are connected to the video source by a cable and that any decompression is effected by the video source. But the data rates of raw three dimensional video are so high that it seems pointless to decompress the signal remote from the display, merely then to be presented with the challenge of transmitting a raw signal. Rather the decompression should take place as close to the addressing device as possible (perhaps even within the addressing device) and it is convenient that both micro-mirror and ferroelectric arrays are mounted on carriers which plug directly into a printed circuit board. The complexity and output data rate of existing interfaces for three dimensional video suggests that the decompression machine will have computational power comparable to that of a typical computer, and with the current trend for the display to dominate the cost of a computing system it must be questioned whether there continues to be any advantage in going to the effort of separating the computer from the display.

This section has brought the paper to a conclusion by attempting to demonstrate in some detail that it is practicable with existing technology to display a medium-sized colour three dimensional video image with no moving parts, an adequate field of view and no flaw lines. Three dimensional video is not some remote or esoteric prospect: it is a viable, analytic technology and its development, like that for two dimensional video, will depend on further progress in the three fundamentals of display technology—spatial demultiplexing, screen space bandwidth product, and low cost per unit screen area.

VII: Conclusions

Video three dimensional images can be pixellated in three ways: volumetric, holographic and autostereoscopic. While volumetric images use bandwidth efficiently to give all round viewing and holographic displays have high resolution, autostereoscopic displays image opaque objects with the wide fields of view needed for most applications.

Autostereoscopic displays which track viewers' heads offer the prospect of greatly reduced data rates, but multiple-view autostereoscopy avoids the need, for machine intelligence and the latest such displays time-multiplex views to get the 1° view spacing which seems adequate for the first generation of three dimensional displays.

Although acceptable in the short term, the images on autostereoscopic displays with 1° per view are flawed and may come to irritate. For true three dimensional images the angle per view must be approximately 1/10° for an image 640 pixels wide. At this spacing even an autostereoscopic display with pixel diameter as big as 0.5 mm will be diffraction limited, and its data content no less than that of a hologram. Holograms have greater depths of field than autostereoscopic images, much greater resolution, and are virtually the only option for pixel sizes finer than 0.5 mm.

Holographic and time-multiplexed autostereoscopic pixellation schemes can be combined to give a hybrid which has the virtues of both. A sequentially illuminated holographic display has the same data content, resolution and depth as a hologram, but the field of view of an autostereoscopic display. In principle all that is needed is a liquid crystal display with a space-time periodicity of the order of 1 Mbit s$^{-1}$ cm$^{-1}$, but this is impractical over large areas at low cost.

Faced with the demand for high space-bandwidth products the optical communications industry has developed light valves and high frame-rate arrays sufficient to get the requisite space-time periodicities over large areas. Light valves are simple enough to operate over screen-sized areas at low device cost and the arrays provide a way of spatially distributing data across the light valve which need not be expensive provided they are small. Projecting a small array onto a large light valve therefore gives a display which is cheap and has high resolution for the same reasons that the cathode ray tube does.

The high frame rate array should be as close as possible to the electronics which decompress the three dimensional image in order to minimise high data rate connections. The computational power of the decompression electronics will be comparable to that of most computers, and it is not unlikely that the computer and display systems will therefore come to merge.

The progress of two dimensional video has since its invention been one of steady evolution towards increasing resolution and size, drawing on parallel advances in telecommunications. While the display of video three dimensional images may seem revolutionary, this paper has sought to show that the pixellation and display optics are not unduly sophisticated and that the remaining challenges are the same as for two dimensional video: an increase in the screen's space bandwidth product, an increase in the rate at which data can be physically distributed across the screen, and the attainment of both in a single system without great complexity of manufacture. Photonic components developed for optical telecommunications already meet the requirements for three dimensional video, and the two technologies are likely to continue to interact to their mutual benefit.

FIG. 1: One can display a three dimensional image by showing views of the object on a liquid crystal display and illuminating each to an appropriate direction FIG. 2: Volumetric 3D displays FIG. 3: A three dimensional array of light emitters cannot display opaque images FIG. 4: Holographic 3D displays FIG. 5: Autostereoscopic 3D displays FIG. 6: A three dimensional object looks the same when seen through a pair of slits, one spinning rapidly, the other slowly.

FIG. 7: Close to the screen a perspective image is seen whose composition can be determined by ray tracing.

FIG. 8: A plot of pixel direction (θ) versus pixel position (x) can be used to identify what the viewer sees on the display no matter how distant it is.

FIG. 9: Distant photograph of an autostereoscopic display on which each view comprises a horizontal bar. Permission for Reprint, courtesy Society for Information Display.

FIG. 10: Close-up photograph of an autostereoscopic display on which each view comprises a horizontal bar. Permission for Reprint, courtesy Society for Information Display.

FIG. 11: An off-screen spot can be imaged by setting up rays to converge through it.

FIG. 12: Two views of a cubic array are formed by parallel projection. The minimum angle (Δθ) between the views required for there to be a distinct difference in view content is that required to make one column of rear pixels fully visible, FIG. 13. In the left hand video camera only the front pixels of the distorted cubic array are visible, while in the right hand camera one column of the rear pixels has become visible. As the depth of the distorted cubic array tends to infinity, RAY 1 and RAY 2 tend towards parallel, so the angle between adjacent views tends to the angle between adjacent pixels.

FIG. 14: An autostereoscopic/holographic display with a wide field of view can be made by time-sequentially illuminating a high resolution liquid crystal display. A high resolution liquid crystal display can be assembled from a light valve and a high frame rate array.

Table 1: The angle per view (Δθ) and depth (z) of the three pixellation schemes can be related by the width of the image (x), the depth of the image in pixels ($n_z$), the width of the image in pixels ($n_x$), the field of view of the image (α), the pixel size (Δx), and the wavelength (λ).

TABLE 1

| | Distorted volumetric | Cartesian volumetric | Autostereo | Hologram |
|---|---|---|---|---|
| Angle per view | $\Delta\theta = \dfrac{\alpha}{n_x}$ | $\Delta\theta = \dfrac{1}{n_z}$ | $\Delta\theta \geq \dfrac{\lambda}{\Delta_x}$ | $\Delta\theta \geq \dfrac{n_x \lambda}{x}$ |
| Depth | ∞ | $z = n_z \Delta z$ | $z \leq \dfrac{(\Delta x)^2}{\lambda}$ | $z \leq \dfrac{x \cdot \Delta x}{\lambda}$ |

REFERENCES

[1] J. E. Wickham, "Minimally invasive surgery future developments".*British Medical Journal,* Vol. 308, pp. 193–196, January 1994.

[2] T. Motoki, H. Isono, and I. Yuyama, "Recent status of 3-dimensional television research", *Proc. IEEE,* Vol. 83, pp. 1009–1021, 1995.

[3] A. C. Traub, U.S. Pat. No. 3,493,290

[4] P. H. Mills, H. Fuchs, and S. M. Pizer, "High speed interaction on a vibrating mirror 3D display," in *Proc. SPIE,* vol. 507, pp. 93–101, 1994.

[5] C. C. Tsao, and J. S. Chen, "Moving screen projection: a new approach for volumetric three-dimensional display," in *Proc. SPIE,* vol. 2650, pp. 254–264, 1996.

[6] K. Kameyama, K. Ohtomi, and Y. Fukui, "Interactive volume scanning 3D display with an optical relay system and multidimensional input devices," in *Proc. SPIE,* vol. 2915, pp. 12–20, 1993.

[7] H. Yamada, K. Yamamoto, M. Matsushita, J. Koyama, K. Miyaji, "3D display using laser and moving screen" in *Japan Display 89, Society for Information Display,* pp. 630–633, 1989.

[8] K. Kameyama, K. Ohtomi, and Y. Fukui, "Interactive volume scanning 3-D display with an optical relay system and multidimensional input devices", in *Proc. SPIE,* vol. 1915, pp. 12–20, 1993.

[9] D. G. Jansson, and R. P. Kosowky, "Display of moving volumetric images," in *Proc. SPIE,* vol. 507, pp. 82–92, 1984.

[10] M. E. Lasher, P. Soltan, W. J. Dahlke, N. Acantilado, and M. McDonald, "Laser-projected 3D volumetric displays," in *Proc. SPIE,* vol. 2650, pp. 285–295, 1996.

[11] D. Bahr, K. Langhans, M. Gerken, C. Vogt, D. Bezency and D. Homann, "FELIX: a volumetric 3D laser display," in *Proc. SPIE,* vol. 2650, pp. 265–273, 1996.

[12] R. D. Williams, and F. Garcia, "A real-time autostereoscopic multiplanar 3D display system," in *SID Int. Symp.,* Anaheim, Calif., USA, May 24–26, 1988, pp. 91–94, 1988.

[13] B. G. Blundell, A. J. Schwarz, and D. K. Horell, "Cathode-ray sphere—a prototype system to display volumetric 3-dimensional images" Optical Engineering, 1994, Volume33, Number 1, pages 180–186

[14] E. A. Downing, L. Hesselink, R. M. Macfarlane, and C. P. Barty, "Solid-state three-dimensional computer display" in Conference Proceedings—Lasers and Electro-Optics Society Annual Meeting, Vol. 8, pp. 6–7, 1994.

[15] I. I. Kim, E. J. Korevaar, H. Hakakha, "Three-dimensional volumetric display in rubidium vapor," in *Proc. SPIE,* vol. 2650, pp. 2274–284, 1996.

[16] T. Hattori, D. F. McAllister, and S. Sakuma, "Spatial modulation display using spatial light modulators," Optical Engineering, Vol. 31, pp. 350–352, February 1992.

[17] K. Higuchi, K. Ishii, J. Ishikawa, and D. Hiyama, "Experimental holographic movie IV: the projection-type display system using a retro-directive screen," in *Proc. SPIE,* vol. 2406, pp. 20–26, 1995.

[18] H. Katsuma, and K. Sato, "Electronic display system using LCD, laser-diode, and holography camera," in *Proc. SPIE,* vol. 1914, pp. 212–218, 1993.

[19] K. Maeno, N. Fukaya, O. Nishikawa, K. Sato, and T. Honda, "Electro-hlographic display using 15 mega pixels LCD," in *Proc. SPIE,* vol. 2652, pp. 15–23, 1996.

[20] N. Hashimoto, and S. Morokawa, "Motion-picture holography using liquid-crystal television spatial light modulators", in *SID Int. Symp.,* vol. 26, pp. 847–850, 1995.

[21] M. W. Thie, J. Kukins, and D. A. Gregory, "Optically addressed SLM-based holographic display," in *Proc. SPIE,* vol. 2488, pp. 408–416, year?.

[22] H. Farhoosh, Y. Fainman, K. Urquhart, and S. H. Lee, "Real-time display of 3-D computer-data using computer generated holograms," in *Proc. SPIE,* vol. 1052, pp. 172–176, 1989.

[23] M. Lucente, R. Pappu, C. J. Sparrell, and S. A. Benton, "Progress in holographic video with the acoustooptical modulator display", in *Proc. SPIE,* vol. 2577, pp. 2–7, 1995

[24] J. S. Kollin, "Time multiplexed auto stereoscopic three dimensional imaging system", U.S. Pat. No. 4,853,769, June 1987

[25] J. Y. Son, S. A. Shestak, S. K. Lee, and H. W. Jeon, "Pulsed laser hologhraphic video," in *Proc. SPIE,* vol. 2652, pp. 24–28, 1996.

[26] T. Yamazaki, K. Kamijo, and S. Fukuzumi, "Quantitative evaluation of visual fatigue encountered in viewing stereoscopic 3D display—near point distance and visual

[27] evoked potential study," in *Japan Display '89, Society for Information Display*, pp. 606–609, 1989

[27] D. J. Trayner, and E. Orr, "Autostereoscopic display using optical elements," in *Proc. SPIE*, vol. 2653, pp. 65–74, 1996.

[28] P. V. Harman, Autostereoscopic display system," in *Proc. SPIE*, vol. 2653, pp. 56–64, 1995.

[29] D. Ezra, "Look, no glasses," *IEE Review*, vol. 42, pp. 187–189, September 1996.

[30] N. Tetsutani, K. Omura, and F. Kishino, "Wide-screen autostereoscopic display system employing head-position tracking," *Optical Engineering*, Vol. 33, pp. 3690–3697, November 1994.

[31] H. Imai, M. Imai, Y. Ogura, and K. Kubota, "Eye-position tracking stereoscopic display using image shifting optics," in *Proc. SPIE*, vol. 2653, pp. 49–55, 1996.

[32] L. McMillan, G. Bishop, "Head-tracked stereoscopic display using image warping," in *Proc. SPIE*, vol. 2409, pp. 21–30, 1995.

[33] A. Katayama, K. Tanaka, T. Oshino, and H. Tamura, "Viewpoint-dependent stereoscopic display using interpolation of multiviewpoint images," in *Proc. SPIE*, vol. 2409, pp. 11–20, 1995.

[34] T. Hattori, "On the wall stereoscopic liquid cystal display," in *Proc. SPIE*, vol. 2409, pp. 41–47, 1995.

[35] S. Omori, J. Suzuki, S. Sakuma, "Stereoscopic display system using backlight distribution", in *SID Int. Symp.*, vol. 26, pp. 855–858, 1995

[36] K. Mase, Y. Watanabe, Y. Suenaga, "A religion head motion detection system," in *Proc. SPIE*, vol. 1260, pp. 262–269, 1990.

[37] K. C. Yow and R. Cipolla, "A probalistic framework for perceptual grouping of features for human face detection," in *Proc. $2^{nd}$ Int. Conf. On Automatic Face and Gesture Recognition*, Vermont, pp 16–21, 1996.

[38] H. Isono, M. Yasuda, H. Kusaka, and T. Morita, "3D flat-panel displays without glasses," in *Japan Display '89, Society for Information Display*, pp. 626–629, 1989.

[39] M. Brewin, M. Forman, and N. A. Davies, "Electronic capture and display of full-parallax 3D images," in *Proc. SPIE*, vol. 2409, pp. 118–124, 1995.

[40] J. Hamasaki, M. Okada, and S. Utsunomiya, S. Uematsa, and O. Takeuchi, "Autosteroscopic 3D TV on a CRT," *SID Int. Symp.* May 9, 1991, paper 38.8, 1991.

[41] J. Guichard, and A. Poirier, "An experiment in three-dimensional television," Radiodiffusion-Telev (France), vol. 20, pp. 23–29, 1986.

[42] C. van Berkel, A. R. Franklin, and J. R. Mansell, "Design and applications of multiview 3D-LCD," in *Euro Display '96, Society for Information Display*, pp. 109–112, 1996.

[43] K. Sakamoto, M. Okamoto, H. Ueda, H. Takahashi, and E. Shimizu, "Real-time 3-D color display using a holographic optical element," in *Proc. SPIE*, vol. 2652, pp. 124–131, 1996.

[44] G. P. Nordin, J. H. Kulick, M. Jones, P. Nasiatka, R. G. Lindquist, and S. T. Kowel, "Demonstration of a novel three-dimensional autostereoscopic display." *Optics Letters*, vol. -19, pp. 901–903, June 1994.

[45] T. Toda, S. Takahashi, and F. Iwata, "Three-dimensianal (3D) video system using grating image," in *Proc. SPIE*, vol. 2652, pp. 54–61, 1996.

[46] R. Borner, "Autostereoscopic 3D-imaging by front and rear projection and on flat-panel displays", *Displays*, vol. 14, pp. 39–46, 1993.

[47] G. Bader, E. Lueder, J. Fuhrmann, "An autostereoscopic real-time 3D display system," in *Euro Display '96, Society for Information Display*, pp. 101–104, 1996.

[48] Y. Kajiki, H. Yoshikawa, and T. Honda, "3D display with focused light array," in *Proc. SPIE*, vol. 2652, pp. 106–116, 1996.

[49] G. B. Meachum, "Autostereoscopic displays—past and future," in *Proc. SPIE*, vol. 624, pp. 90–101, 1986.

[50] R. J. Felix, "Multiplax video display," in *Proc. SPIE*, vol, 2716, pp. 50–56, 1994.

[51] J. B. Eicheniaub, "Autostereoscopic display with illuminating lines and light valve" U.S. Pat. No. 4,717,949, Jan. 5, 1998.

[52] J. B. Eicheniaub, D. Hollands, and J. M. Hutchins, "A prototype flat plane hologram-like display that produces multiple perspective views at full resolution", in *Proc. SPIE*, vol. 2409, pp. 102–112, 1995.

[53] A. R. Travis, "Autostereoscopic 3-D display," *Applied Optics*, vol. 29, pp. 4341–4343, October 1990.

[54] H. Isono, M. Yasuda, and H. Sasazawa, "Multu-viewpoint 3D display with time-divided backlighting system," *Electron. Commun. Jpn.* 2, *Electron. (USA)*, vol. 76, no. 7, pp. 77–84, July 1993.

[55] K. Nito, T. Fujuoka, N. Kataoka, and A. Yasuda, "TFT-driven monostable ferroelectric liquid crystal display with wide viewing angle and fast repsponse times," in *AM-LCD '94, Society for Information Display*, pp. 48–51, November 1994.

[56] L. Noble, "Use of lenses to enhance depth perception," in *Proc. SPIE*, vol. 761, pp. 126–128, 1997.

[57] R. B. Collender, "3D television, movies and computer graphics without glasses", *IEEE Transactions on Consumer Electronics*, vol. CE32, pp. 56–61, 1986.

[58] H. B. Tilton, "An autostereoscopic CRT display," in *Proc. SPIE*, vol. 120, pp. 68–72, 1997.

[59] R. G. Batchko, "Three-hundred-sixty degree electro-= holographic stereogram and volumetric display system," in *Proc. SPIE*, vol. 2176, pp. 30–41, 1994.

[60] A. R. Travis, S. R. Lang, J. R. Moore, and N. A. Dodgson, "Time-multiplexed three-dimensional video display," *Journal of the SID*, vol. 3, pp. 203–205, 1995.

[61] J. L. Baird, "Stereoscopic colour television," *The Wireless World*, vol. 48, pp. 31–32, February 1942.

[62] R. Herbert, "J. L. Baird's colour television 1937–46", Television: Journal of the Royal Television Society, January/February 1990, pages 24 to 29

[63] T. A. Theoharis, A. R. Travis, and N. E. Wiseman, "3D display: synthetic image generation and visual effect simulation", Computer Graphics Forum 9 (1990) pp. 337–348, 1990.

[64] S. Pastoor, K. Schenke, "Subjective assessments of the resolution of viewing directions in a multiviewpoint 3DTV system," *Proceedings of the Society for Information Display*, Vol. 30/3, pp. 217–223, 1989.

[65] Hecht, E; "Optics", second edition, Addison-Wesley 1989, page 419

[66] Martin, R. et. al.; "A 6.3-Mpixel AMLCD", Society for Information Display, International Symposium, Digest of Technical Paper Volume XXIV, Seattle, May 28–20, 1993, pages 704 to 707

[67] E. Hecht, and A. Zajac, *Optics*, Reading, Mass., USA; Addison-Wesley, ch. 11, p. 412.

[68] L. W. Yim, A. B. Davey, and A. R. Travis, "Optionally addressed spatial light modulators using the twisted smectic C° liquid crystal effect," in *Ferroelecrtics*, Vol. 181, pp. 147–160, 1996.

[69] F. Perennes, W. A. Crossland, D. Kozlowski, and Z. Y. Wu, "New reflective layer technologies for fast ferroelectric liquid crysoptically addressed spatial light modulators," in *Ferroelectrics*, Vol. 181, pp. 129–137, 1996.

[70]T. D. Wilkinson, W. A. Crossland, T. Coker, A. B. Davey, M. Stanley, T. C. Yu, "The fast bitplane SLM: a new ferroelectric liquid crystal on silicon spatial light modulator," in *Spatial Light Modulators,* Technical Digest (Optional Society of America), pp. 149–150, 1997.

[71]L. J. Hornbeck, "Digital light processing and MEMS: timely convergence for a bright furture," presented at Micromachining and microfabrication '95, SPIE, October 1995.

What is claimed is:

1. A three dimensional video display including:

a screen (4) on which successive frames of patterns can be displayed and means (6) for projecting an array of collimated light beams which can illuminate the whole screen (4) through a series of discrete directions in synchronism with the display of successive frames;

wherein said screen (4) includes a layer of liquid crystal material (13) located between a front plate (8) and a rear plate (9); a layer of light sensitive material (15), operable to change the voltage on the adjacent layer (13) of liquid crystal material; a reflective layer (14) between the liquid crystal material (13) and the light sensitive material and electrode structures (10, 11) on the inner faces of plates (8, 9) for applying a voltage across the liquid material (13), the electrodes (10, 11) forming collectively an array of separately addressable segments in the liquid crystal layer (13) and each collimated light beam 6 is arranged to illuminate the whole of front plate 8.

2. The display of claim 1 wherein the screen comprises a plurality of separate areas, each independently addressable in field time to form collectively a complete frame of a pattern.

3. The display of claim 2 wherein the screen is formed by an optically addressed spatial light modulator having a plurality of separately addressable segments each arranged to receive a sub-pattern in a field time.

4. The display of any of claim 1, 2 or 3 and further including means (1) for projecting patterns on the image screen (4, 8, 13).

5. The display of claim 4 wherein the means for projecting (1) includes means for projecting a plurality of field patterns in sequence on spatial separate areas (A to P) of the image screen or light sensitive layer (15) to form a complete frame of an image.

6. The display of claim 5 wherein the means for projecting includes a digital micro mirror device having a matrix of separately addressable pixels collectively providing a pattern or part of a pattern for projection on to the screen (4).

7. The display of claim 6 where the means for projecting includes a cathode ray tube video display for projecting an image or a part of an image on to the screen (4).

8. The display of claim 1 and further including an optical arrangement wherein the means (6) for projecting an array of collimated light beams is arranged substantially in the focal plane of the optical arrangement.

9. The display of claim 1 where each collimated light beams is laser light.

10. The display of claim 1 where the collimated light beams are of different wavelengths.

11. The display of claim 4 and further including a grating (3) between the projecting means (1) and screen (4).

* * * * *